United States Patent [19]
Stewart

[11] Patent Number: 5,493,852
[45] Date of Patent: Feb. 27, 1996

[54] LAWNMOWER ATTACHMENT SPREADER

[76] Inventor: John D. Stewart, 111 Black St., Schulenburg, Tex. 78956

[21] Appl. No.: 379,051

[22] Filed: Jan. 27, 1995

[51] Int. Cl.[6] .................... A01C 15/06; A01D 75/00
[52] U.S. Cl. .............. 56/16.8; 56/DIG. 5; 222/485; 222/561
[58] Field of Search ................ 56/16.8, DIG. 5; 222/153, 482, 485, 561, 565; 239/144, 443, 444, 566, 663

[56] References Cited

U.S. PATENT DOCUMENTS

| | | | |
|---|---|---|---|
| Re. 32,067 | 1/1986 | Emory | 56/16.8 |
| 2,639,571 | 5/1953 | Kelly | 56/DIG. 5 X |
| 2,692,705 | 10/1954 | Marihart | 222/565 X |
| 2,792,970 | 5/1957 | Gaiman | 56/DIG. 5 X |
| 2,974,963 | 3/1961 | McBride | 56/DIG. 5 X |
| 3,021,983 | 2/1962 | Blocksom | 222/485 X |
| 3,102,375 | 9/1963 | Troka et al. | 56/16.8 X |
| 3,162,972 | 12/1964 | McCurley | 43/129 |
| 3,722,820 | 3/1973 | Klint, Jr. | 239/129 |
| 3,857,515 | 12/1974 | Zennie | 239/169 |
| 3,971,198 | 7/1976 | Lane | 56/202 |
| 4,266,319 | 5/1981 | Mason | 16/111 A |
| 4,327,541 | 5/1982 | Emory | 56/16.8 |
| 5,326,175 | 7/1994 | Carter | 383/22 |

*Primary Examiner*—David J. Bagnell
*Attorney, Agent, or Firm*—Fulbright & Jaworski

[57] ABSTRACT

A universal spreader attachment consisting of an inverted triangular hopper hung from the cross-brace support of the handlebars of a lawnmower, with holes drilled in the bottom of the hopper to allow the substance being spread to disperse onto the lawn. The holes are opened and closed by moving a sliding member, which has corresponding holes drilled into it.

5 Claims, 2 Drawing Sheets

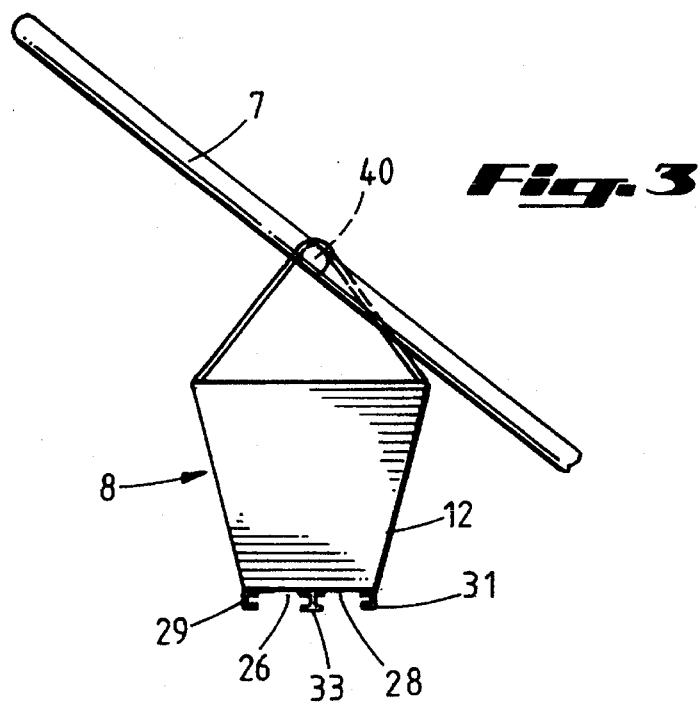
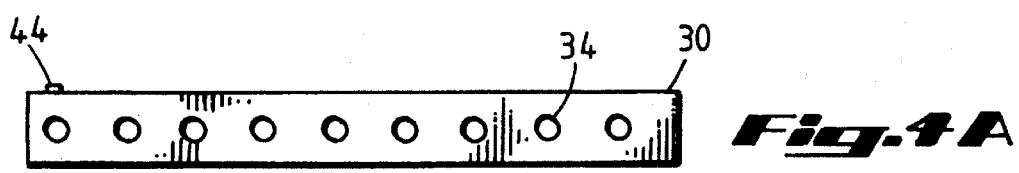
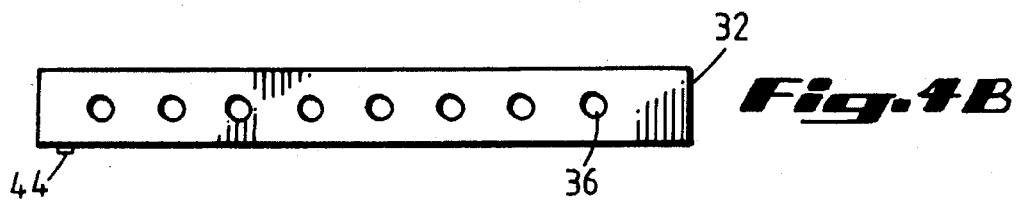
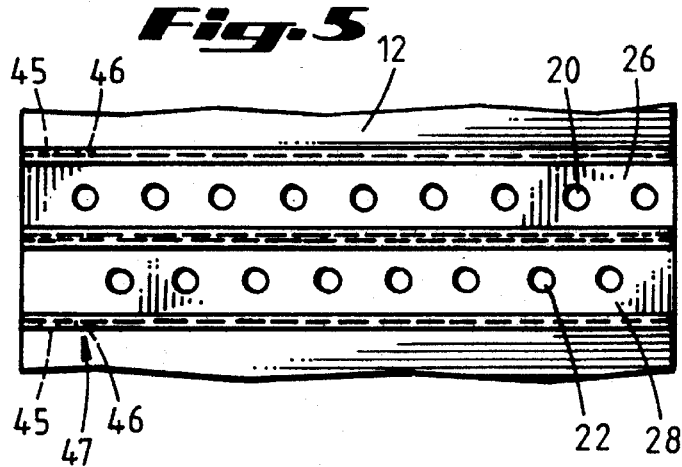
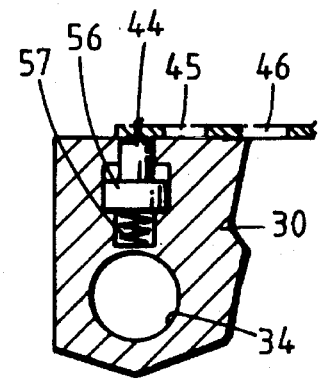

5,493,852

LAWNMOWER ATTACHMENT SPREADER

BACKGROUND OF THE INVENTION

The present invention relates in general to an apparatus for dispensing fertilizer or other material in the care and maintenance of lawns.

It has been the practice for the homeowner to use a lawnmower for cutting the grass and then use a separate machine or other device for spreading fertilizer. Such use of multiple, single-purpose machines is economically inefficient and time-consuming. A single machine, or combination of machines, which could perform the same functions with one application would increase efficiency and reduce the amount of time needed to mow and fertilize a lawn.

Numerous attempts have been made to solve the inefficiencies of lawn care by mowing and fertilizing at one and the same time. The prior art has dealt principally with the formulation of dual-purpose machines which by and large are just as uneconomical as the multiple single-purpose machines for the same work to be done. What has been needed in the industry is a simple yet reliable apparatus which can be quickly and easily mounted on a lawnmower, which would allow application of fertilizers at the same time as the lawn is being mowed.

The present invention satisfies these parameters by being attachable to any handlebar-type lawnmower which has a minimum of one cross-brace on the handlebars. As a simple attachment, it can be designed to have universal application to all handlebar-type lawnmowers and thereby reduce its cost considerably.

This invention also promises to save the home lawn and garden do-it-yourselfer valuable time. A device that dispenses fertilizer over the lawn at the same time grass is being mowed saves the operator the burden of re-traversing the lawn a second time.

This invention also represents an improvement over the prior art in that it applies the fertilizer in a manner most suited to the needs of the typical homeowner. This is because the spreader applies fertilizer immediately behind the lawnmower, and thus allows the operator of the lawnmower to control the areas of the lawn which receive an application of fertilizer and to be certain of the areas of the lawn which have been fertilized.

SUMMARY OF THE INVENTION

The present invention, as embodied, provides a spreader which is quickly and easily mounted on the cross-brace of the handlebars of a handlebar-type lawnmower. The invention allows for control of the rate at which fertilizer is released and allows for no contact to take place between the fertilizer and the lawnmower. The preferred embodiment of the invention allows the operator of the lawnmower to visually identify the areas of the lawn which have received an application of fertilizer.

It is an object of the present invention to combine mowing operations with fertilization, resulting in efficiencies of both time and, when applicable, money.

It is another object of the present invention that the apparatus which performs the spreading be universal in nature, easily mountable on all handlebar-type lawnmowers, controllable as to fertilization rate while maintaining uniformity of spread, and maintain separation of the fertilizer from the lawnmower, including also the blades, in order that undesirable corrosive/chemical reactions of the lawnmower and its associated parts will not take place.

It is another object of the present invention that the length of the spreader be equal to the width of the cut of the lawnmower, thereby allowing the operator of the lawnmower to visually observe which areas of the lawn have received an application of fertilizer by observing which areas of the lawn the lawnmower has passed over. In using the term "fertilizer" and its variants herein, such a term includes any dispensable lawn care product, such as, for example, seeds, pesticides, and other chemicals, not only the usual lawn fertilizers.

It is another object of the present invention that the spreader have locking means for locking the spreader in the open or closed position.

It is still another object of the present invention that the hopper of the spreader have an open top for allowing a visual determination of the amount of substance remaining in the hopper.

It is another object of the present invention that when two or more slide members are used, the holes in the first slide member are varied relative to the holes in the second slide member in order to more evenly spread the substance being dispensed.

It is another object of the present invention that a vibration transmitting member may be mounted between the hopper and the deck of the lawnmower to transmit the vibration of the lawnmower to the hopper, thereby, promoting the movement of the substance being dispensed through the holes in the hopper and the slide member.

To achieve the foregoing objects, there is disclosed an apparatus for spreading fertilizer mounted on the handlebar of a lawnmower comprising a hopper having sides and a bottom with holes drilled therein, the hopper having an open top; at least one slide channel formed on the bottom of said hopper; a slide member slidably disposed within the slide channel, the slide member having holes drilled therein which correspond to the holes in the hopper; locking means for locking the slide member in the open or closed position; and means for connecting the hopper to the lawnmower.

These and other advantages of the invention will become more clear from the detailed description of the preferred embodiments to follow, given for the purpose of disclosure, and taken in conjunction with the accompanying drawings and the claims of the invention.

DESCRIPTION OF THE DRAWINGS

FIG. 3 is a side view of the spreader attached to the cross-brace of the handlebars of a lawnmower.

FIG. 4A is an elevational view of the first sliding member, depicting the holes drilled therein.

FIG. 4B is an elevational view of the second sliding member, depicting the holes drilled therein.

FIG. 5 is a bottom view of the inverted truncated hopper, depicting the holes drilled therein and the spring loaded lock receptacle.

FIG. 6 is an elevational view of the spring loaded lock, depicting the locking mechanism.

DESCRIPTION OF THE PREFERRED EMBODIMENT

Figure 1:
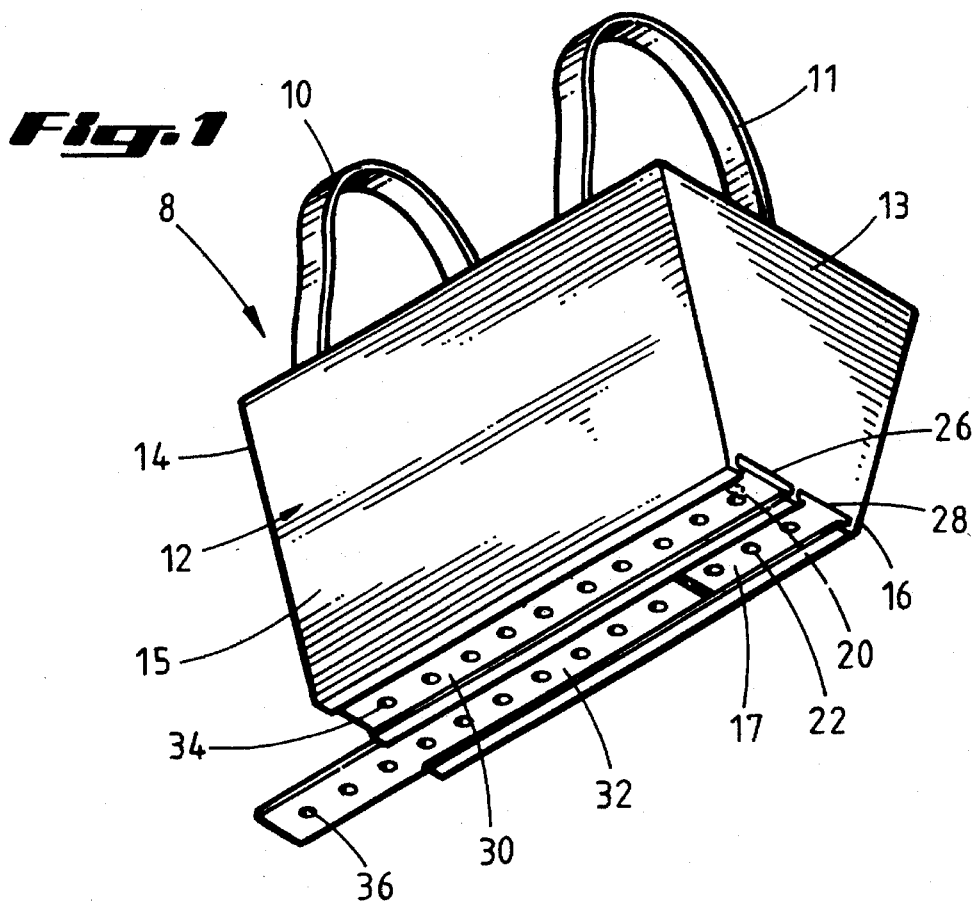
FIG. 1 is an overall perspective view of the preferred embodiment of the lawnmower attachment spreader of the present invention.

In FIG. 1, a preferred embodiment of the lawnmower attachment spreader 8 of the present invention can be seen. In this view, the spreader 8 is shown with two plastic attachment straps 10 and 11 mounted on the top of the inverted triangular hopper 12. The hopper 12 has a first end 13 and a second end 14, a first side 15 and a second side 16 and a bottom 17.

The means of releasing and controlling the amount of fertilizer which is dispensed onto the lawn can also be seen. Two slide channels 26 and 28 containing two sliding members 30 and 32, respectively, are shown. While a single slide member may be utilized, the use of two slide channels 26 and 28 is preferable because it allows for improved regulation of the amount of substance which is dispensed onto the lawn. One or both slide channels can be opened to control the amount of fertilizer being released. Also shown are equally spaced hopper holes 20 and 22 drilled in the bottom 17 of the inverted hopper 12, the hopper holes 20 and 22 are equally spaced along the longitudinal axis of the hopper 12. Also shown are equally spaced slide member holes 34 and 36 drilled in the sliding members 30 and 32, respectively, the slide member holes 34 and 36 being equally centered along the longitudinal axis of the slide members 30 and 32. In order to release fertilizer from the hopper 12, the slide member holes 34 and 36 are moved into alignment with the hopper holes 20 and 22 to form an opening for the fertilizer to fall to the ground. In order to limit or stop the release of fertilizer from the hopper 12, either or both of the slide members 30 and 32 can be moved so that the slide member holes 34 and 36 are partially or totally out of alignment with the hopper holes 20 and 22, respectively.

First hopper holes 20 may be staggered relative to second hopper holes 22 with corresponding slide member holes 34 and 36, respectively, also then being staggered relative to each other. Staggering of the first hopper holes 20 and first slide member holes 34 relative to the second hopper holes 22 and second slide member holes 36 provides a more uniform application of substance being applied to the lawn.

Although the preferred embodiment shows two slide channels 26 and 28 and two slide members 30 and 32, a further embodiment of the claimed invention includes a single slide channel and a single slide member. In this embodiment, regulation of the amount of substance being released is controlled through the layout of the holes. The hopper holes 20 and the slide member holes 34 are initially positioned so that the holes are not in alignment. Movement of the slide member 30 brings the slide member holes 34 into closer alignment with the hopper holes 20. The maximum release of substance from the hopper 12 is achieved when the hopper holes 20 are fully aligned with the slide member holes 34. Depending on the amount of substance which needs to be applied, the slide member holes 34 can be moved further in or out of alignment with the hopper holes 20.

As can best be seen in FIG. 1, the hopper 12 has an inverted generally triangular configuration in side view. As can best be seen in FIG. 2, the spreader 8 is mounted on a conventional lawnmower 2 having rearwardly extending handlebars 7. The spreader 8 is connected to a cross-brace 40 of the handlebars 7 by a first strap 10 and a second strap 11. Mounting the spreader 8 at a point behind the deck of the lawnmower 5 and the cutting means 3 prevents contact between the substance being dispensed and the components of the lawnmower 2 and the cutting means 3, thereby, preventing any corrosive or chemical attack from taking place between the substance and the lawnmower 2 and the cutting means 3. Additionally, the position of the spreader 8 behind the cutting means 3 prevents the rotary motion of the cutting means 3 from scattering the substance being applied.

Figure 2:
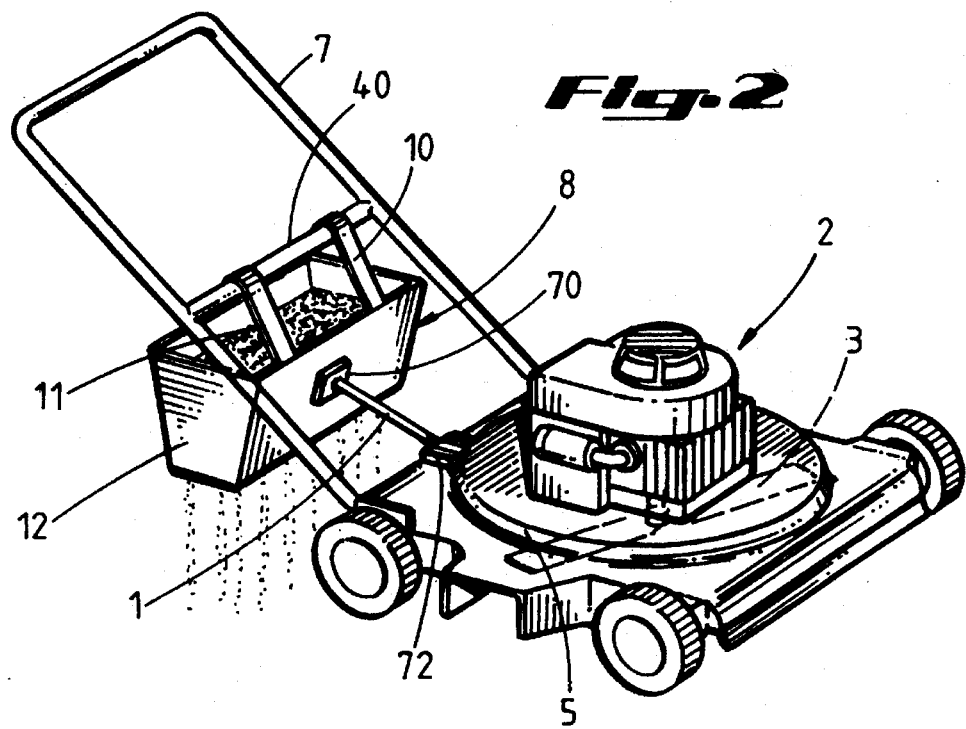
FIG. 2 is an elevational view of the preferred embodiment of the spreader invention mounted on an exemplary lawnmower.

In FIG. 2, the lawnmower attachment spreader 8 of the present invention can be seen as it is mounted on the cross-brace 40 of the handlebars 7 of a lawnmower 2. In a further refinement of the preferred embodiment, a vibration transmitting member such as a rod 1 is shown attached to the hopper 12 by a vibration transmitting mount 70 and to the rear deck of the lawnmower 5 by a similar vibration transmitting mount 72. The rod 1 transfers the vibration of the lawnmower 2 to the hopper 12, thereby, facilitating the movement of the substance being applied through the hopper holes 20 and the slide member holes 34.

In FIG. 3 a side view of the spreader 8 is shown. The inverted triangular shape of the hopper 12 is depicted. Also shown are slide channels 26 and 28. The slide channels are formed by the attachment of two sections of U-shaped channel 29 and 31 attached longitudinally to the outer edges of the hopper 12, such that the opening of the U-shaped channel forms one of the grooves necessary for the sliding members 30 and 32 to slide in. Attached longitudinally in the center of the hopper 12 is an I-shaped channel 33 which forms the second groove necessary for allowing the sliding members 30 and 32 to slide in. In a further embodiment of the claimed invention a single slide channel may be formed using U-shaped channel sections 29 and 31 to form the single slide channel.

FIGS. 4A and 4B are elevational views of sliding members 30 and 32 with holes 34 and 36 drilled therein. The holes 34 and 36 are equally spaced along the longitudinal axis of the sliding member 30 or 32. The spacing and diameter of the holes 34 and 36, as well as the number of holes in the sliding member 30 or 32, may vary depending upon the substance being applied.

FIG. 6 is an elevational view of the spring loaded lock 44. The T-plunge 56 can be seen in the retracted position. The spring 57 can also be seen in the compressed state. The spring-loaded lock 44 is used to lock the sliding members 30 and 32 into the open or closed position. The use of the lock 44 prevents the vibration resulting from the lawnmower 2 and the movement of the lawnmower from moving the sliding members 30 and 32 out of the desired operating position.

FIG. 5 is a bottom view of the hopper 12 showing the hopper holes 20 and 22 drilled in the hopper 12. The spacing, diameter, and number of hopper holes 20 and 22, as well as the spacing, diameter and number of slide member holes 34 and 36, may vary, but should correspond to each other. That is, the slide member holes 34 and 36 will match up with the hopper holes 20 and 22 and will be moved into the required degree of alignment with the hopper holes 20 and 22 depending on the substance being applied and the amount of flow through the hopper holes 20 and 22 and the slide member holes 34 and 36 which is desired.

As best seen in FIG. 5, the spring-loaded lock receptacle 47 is comprised of two openings 45 and 46 in each of the U-shaped channels 29 and 31. When the sliding member 30 or 32 is locked into opening 45, the spreader is in the closed position. When the sliding member 30 or 32 is locked into opening 46, the spreader is in the open position. The use of a locking mechanism prevents movement out of alignment of the sliding members 30 and 32 during long periods of operation.

The present invention, therefore, is well adapted to carry out the objects and attain the ends and advantages mentioned as well as others inherent therein. While a presently preferred embodiment of the invention has been given for the purpose of disclosure, numerous changes in the details of construction, and steps of the process will be readily apparent to those skilled in the art, and which are encompassed within the spirit of the invention and the scope of the appended claims.

What is claimed is:

1. A spreader for applying substances to a lawn comprising, an inverted triangular hopper having sides and a bottom, said bottom having holes therein, first and second slide channels formed on said bottom, first and second slide members each having an outside, said first slide member being slidably disposed in said first slide channel and said second slide member being slidably disposed in said second slide channel, said first and second slide members each having holes therein which can be aligned with said holes in said bottom, and wherein said first slide member holes are staggered relative to said second slide member holes.

2. The spreader of claim 1 including, spring-loaded locking means for locking said first or second slide members open or closed, the locking means being comprised of,
   a first spring-actuated plunger located on the outside of said first slide member,
   a second spring-actuated plunger located on the outside of said second slide member,
   said first slide channel receiving said first slide member, said first slide channel having first and second openings for receiving said first spring-actuated plunger,
   said second slide channel receiving said second slide member, said second slide channel having first and second openings for receiving said second spring-actuated plunger.

3. In combination with a lawnmower having a rearward extending handlebar with a cross-brace and a cutting means, a spreader for applying substances to a lawn comprising, an inverted triangular hopper having sides and a bottom, said bottom having holes therein, first and second channels formed on said bottom, first and second slide members each having an outside, said first slide member being slidably disposed in said first slide channel and said second slide member being slidably disposed in said second slide channel, said first and second slide members each having holes therein which can be aligned with said holes in said bottom, said first slide member holes being staggered relative to said second slide member holes, and means for connecting the spreader to the cross-brace of the handlebar of the lawnmower.

4. The invention of claim 3 including, a vibration transmitting member connected directly between the hopper and a rear deck of the lawnmower.

5. The invention of claim 3 including, spring-loaded locking means for locking said first or second slide members open or closed, the locking means being comprised of,
   a first spring-actuated plunger located on the outside of said first slide member,
   a second spring-actuated plunger located on the outside of said second slide member,
   said first slide channel receiving said first slide member, said first slide channel having first and second openings for receiving said first spring-actuated plunger,
   said second slide channel receiving said second slide member, said second slide channel having first and second openings for receiving said second spring-actuated plunger.

* * * * *